Nov. 6, 1928.
O. P. BUSHNELL
1,690,528
APPARATUS AND METHOD FOR MAKING FIBROUS BOXES
Filed Aug. 4, 1924
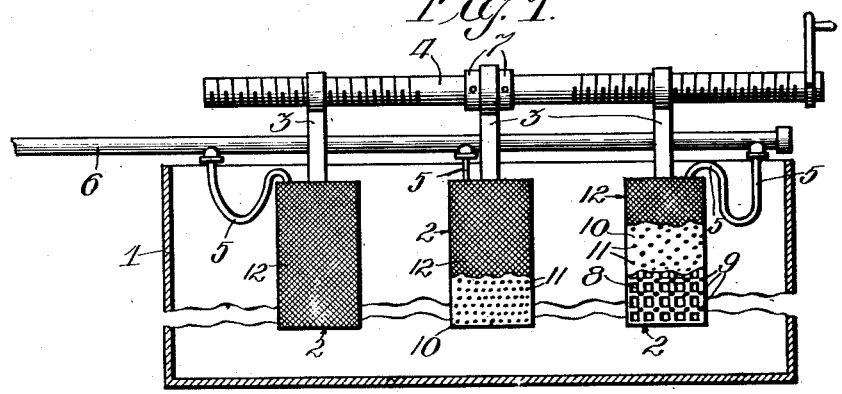
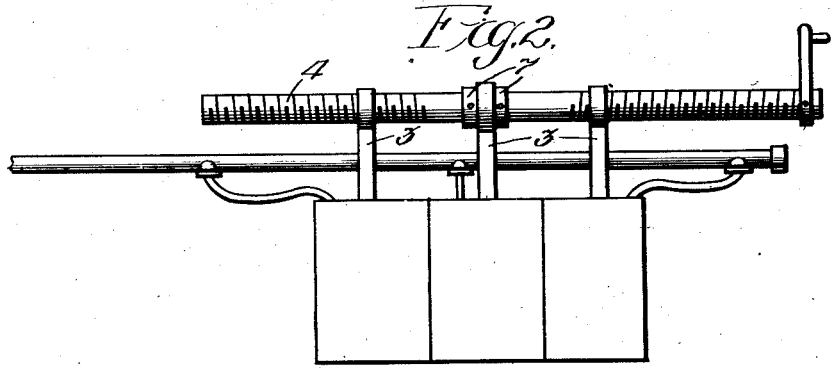
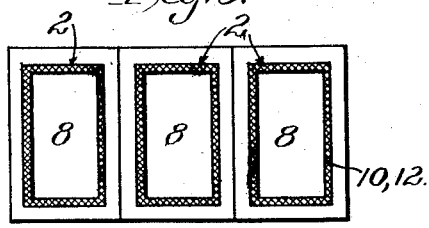
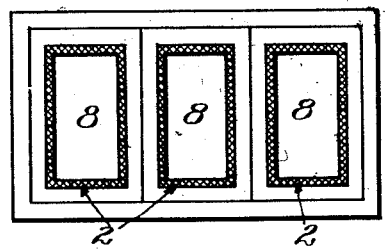
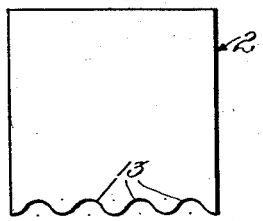
Inventor:
Oscar P. Bushnell
by Wallace R. Lane. Atty.

Patented Nov. 6, 1928.

1,690,528

UNITED STATES PATENT OFFICE.

OSCAR P. BUSHNELL, OF BELLEVILLE, NEW JERSEY, ASSIGNOR, BY MESNE ASSIGNMENTS, TO THE ARVEY MANUFACTURING CO., OF OLEAN, NEW YORK, A CORPORATION OF DELAWARE.

APPARATUS AND METHOD FOR MAKING FIBROUS BOXES.

Application filed August 4, 1924. Serial No. 730,123.

This invention relates to fibrous boxes and more particularly to boxes of this kind which are adapted for use as battery containers, and among the objects of my invention are to produce an improved battery box; to produce a battery box having desirable characteristics not heretofore attained; to provide an improved method of producing battery boxes; to provide a method of making battery boxes which is easily carried out; to provide such a method which will produce very desirable battery boxes; to provide a new and improved apparatus for making battery boxes; to provide apparatus by means of which an improved battery box may be produced; to provide an improved fibrous container; to provide a new method of making fibrous containers; and such other objects, advantages and capabilities as will later more fully appear.

My invention further resides in the combination, construction and arrangement of parts illustrated in the accompanying drawing, and, while I have shown therein a preferred construction and method of production of the same, I desire the same to be understood as illustrative only and not as limiting my invention.

In the drawing annexed hereto and forming a part hereof, Fig. 1 is a vertical, longitudinal section, partly broken away and partly in elevation, showing one form of my apparatus for producing the subject matter of this invention; Fig. 2 is a side elevation showing one stage in the manufacture of a battery box; Fig. 3 is a plan view, partly in section, of the stage shown in Fig. 2; Fig. 4 is a similar view showing a subsequent stage in the manufacture of a battery box in accordance with this invention; and Fig. 5 is an elevation of a battery box showing the bottom corrugations formed during the course of manufacture of the box and designed to support the plates, mostly out of contact with the bottom of the box.

Referring more in detail to the annexed drawing, numeral 1 designates a tank for containing a suspension of fibrous pulp in a liquid, preferably water. A series of formers 2, suspended by any convenient means 3 from a screw threaded shaft 4, are adapted to be placed within the tank 1 and entirely immersed within the suspension in the tank. These formers are preferably formed with solid tops to which are connected pipes 5 by means of which liquid can be withdrawn from the interior of the formers, these pipes being connected by means of a pipe 6 to any suitable suction device. It will be noted that the middle suspending member 3 is prevented by means of collars 7 from moving longitudinally along the shaft 4 and that such shaft is provided at its opposite ends with oppositely directed threads, so that by rotating the shaft in one direction or the other the formers 2 may be caused to approach or recede from the middle former. The purpose of this will be pointed out later.

The formers 2 comprise, individually, a block 8 hollowed out more or less in the interior and provided on the exterior faces with intersecting grooves which have perforations 9 leading therefrom into the hollow interior of the block, so that liquid may pass from the grooves through the perforations 9 into the blocks to be withdrawn through the pipes 5 and 6 as indicated above. Closely engaging the bottom and lateral faces of each of the blocks 8 is a metallic container 10 having perforations 11 extending therethrough for the passage of liquids into the grooves in the block 8. Outside of the container 10 and in close contact therewith is a similarly shaped container 12, preferably made from very fine mesh wire netting.

The suspension in the tank 1 may be kept in agitated condition in any desired manner, as by means of air jets in the bottom of the tank, but vibration of the tank has been found to be a better method. The effect of this, in connection with the suction through pipes 5, and 6, is to cause the fibres of the suspension to lie more or less in parallel planes which are substantially parallel to the faces of the containers, rather than being criss-crossed in directions at angles to the faces of the formers as well as being parallel thereto. After a layer of a certain thickness, dependent upon the desires of the operator, has been deposited upon the formers the shaft 4 is rotated to cause the outer formers to approach the middle one and bring the containers into the positions shown in Fig. 2, the suction being continued until a layer of fibrous material of desired thickness is deposited upon the exterior as shown in Fig. 4, which binds the three cells together, thus forming a unitary whole. After being pressed and dried and then impregnated with a chemical resisting liquid so that the container shall not be subject to deterioration because of the acid or alkali contained therein, the receptacle is hot pressed into final condition, in which condition it looks considerably like bakelite. The number, form and purpose of the ridges 13, in the bottom of the container, will be understood by one skilled in this art without elaboration thereon.

It is of course understood that the specific description of structure and method set forth above may be departed from without departing from the spirit of my invention as set forth in this specification and the appended claims.

Having now described my invention I claim—

1. Apparatus for the making of battery containers, which comprises a tank for holding wood pulp in suspension, a plurality of formers on which the pulp may be deposited by suction, means by which suction may be applied to the formers to cause the pulp to be deposited thereon, and means for causing the formers to approach toward and recede from each other in a horizontal plane.

2. Apparatus for the making of battery containers, which comprises a tank for holding wood pulp in suspension, a plurality of formers on which the pulp may be deposited by suction, said formers being immersed in the suspension in the tank, means by which suction may be applied to the formers to cause deposition of the pulp thereon, and means to cause relative movement in a horizontal plane of the formers toward and from each other.

3. The method of making battery boxes which comprises immersing a set of formers in a bath comprising pulp in suspension, withdrawing liquid from the interior of the formers, to cause deposition of the pulp on the surface of the formers, causing the formers to approach until the laterally adjacent faces of the deposited material are in contact, and then causing more pulp to be deposited to unite the several cells integrally.

4. Apparatus for the making of battery containers, comprising in combination a tank for holding pulp in suspension, a plurality of formers on which said pulp may be deposited externally by internal suction, said formers comprising a stationary former and formers movable toward and away from the stationary former, means by which suction may be applied internally of the formers to cause the pulp to be deposited on the exterior thereof, and means for causing the movable formers to approach toward and recede away from the stationary former.

5. Apparatus for the making of battery containers, comprising in combination a tank for holding pulp in suspension, a plurality of formers on which said pulp may be deposited externally by internal suction, said formers comprising a stationary former and formers movable toward and away from the stationary former, means by which suction may be applied internally of the formers to cause the pulp to be deposited on the exterior thereof, and means for causing the movable formers to approach toward and recede away from the stationary former, said movement being characterized by being entirely in a horizontal plane.

In witness whereof, I hereunto subscribe my name to this specification.

OSCAR P. BUSHNELL.